(12) United States Patent
Chen et al.

(10) Patent No.: US 9,232,244 B2
(45) Date of Patent: Jan. 5, 2016

(54) EFFICIENT FRAME FORWARDING IN LARGE SCALE REAL-TIME SCREEN CONTENT SHARING MEETINGS

(75) Inventors: Sijia Chen, Zhejiang (CN); Wayne Liu, Anhui (CN); Siping Tao, Anhui (CN)

(73) Assignee: Cisco Technology, Inc., San Jose, CA (US)

( * ) Notice: Subject to any disclaimer, the term of this patent is extended or adjusted under 35 U.S.C. 154(b) by 600 days.

(21) Appl. No.: 13/609,326

(22) Filed: Sep. 11, 2012

(65) Prior Publication Data

US 2013/0166650 A1 Jun. 27, 2013

Related U.S. Application Data

(60) Provisional application No. 61/582,520, filed on Jan. 3, 2012.

(30) Foreign Application Priority Data

Dec. 23, 2011 (CN) .......................... 2011 1 0437379

(51) Int. Cl.
| | |
|---|---|
| *G06F 15/16* | (2006.01) |
| *H04N 21/2343* | (2011.01) |
| *H04N 21/234* | (2011.01) |
| *H04N 21/845* | (2011.01) |
| *H04N 19/172* | (2014.01) |
| *H04N 19/107* | (2014.01) |
| *H04N 19/164* | (2014.01) |
| *H04N 21/4788* | (2011.01) |

(52) U.S. Cl.
CPC ..... *H04N 21/234381* (2013.01); *H04N 19/107* (2014.11); *H04N 19/164* (2014.11); *H04N 19/172* (2014.11); *H04N 21/23406* (2013.01); *H04N 21/8455* (2013.01); *H04N 21/4788* (2013.01)

(58) Field of Classification Search
USPC .......................................... 709/204
See application file for complete search history.

(56) References Cited

U.S. PATENT DOCUMENTS

| | | | | |
|---|---|---|---|---|
| 7,477,688 | B1 | 1/2009 | Zhang et al. | |
| 7,822,811 | B2* | 10/2010 | Moore | H04L 63/065 |
| | | | | 348/14.08 |
| 8,228,360 | B2 | 7/2012 | Hamilton | |
| 8,264,521 | B2* | 9/2012 | Triplicane et al. | H04M 3/565 |
| | | | | 348/14.1 |
| 2010/0125768 | A1 | 5/2010 | Mauchly et al. | |

* cited by examiner

*Primary Examiner* — Kevin Bates
*Assistant Examiner* — Nazia Naoreen
(74) *Attorney, Agent, or Firm* — Edell, Shapiro & Finnan, LLC

(57) ABSTRACT

Techniques are provided to improve user experience at endpoint devices that are participating in a multipoint screen content sharing session. A server in a multipoint communication system receives video frames from a sending endpoint device in the communication session that involves one or more other endpoint devices that are to receive video frames from the sending endpoint device. The video frames include key reference frames that use either intra-frame prediction or inter-frame prediction based only on other key reference frames. The server stores the key reference frames. When a new receiving endpoint device joins the communication session, the server sends all the stored key reference frames to the new receiving endpoint device. All video frames received from the sending endpoint device are forwarded to existing ordinary receiving endpoint devices. Key reference frames and some, but not all, non-key reference video frames are forwarded to existing low-capacity receiving endpoint devices.

24 Claims, 5 Drawing Sheets

EFFICIENT FRAME FORWARDING IN LARGE SCALE REAL-TIME SCREEN CONTENT SHARING MEETINGS

CROSS-REFERENCE TO RELATED APPLICATIONS

This application claims priority to U.S. Provisional Application No. 61/582,520, filed Jan. 3, 2012, the entirety of which is incorporated herein by reference.

CLAIM OF FOREIGN PRIORITY

This application claims priority to Chinese Application No. 201110437379.9, filed Dec. 23, 2011, the entirety of which is incorporated herein by reference.

TECHNICAL FIELD

The present disclosure relates to multipoint content sharing systems and applications.

BACKGROUND

In a multipoint content sharing system, a sender delivers content to multiple receivers. In real-time content sharing applications, a quick response to newly-joined attendees enhances user experience. An instantaneous decoding refresh (IDR) frame in the H.264 standard is used as a response frame. This is because that the IDR frame applies only intra-frame prediction and does not depend on any previously decoded frame during its decoding.

In response to a request from any receiver in a multipoint sharing session, the sender needs to send out an IDR frame to all receivers. When a new receiver joins, an IDR frame is needed since there is no previously decoded frame to be referred to at the newly-joined receiver.

On the other hand, it is observed that the compression efficiency of frames applying only intra-prediction can be low in screen content coding using H.264. Given the common case that the resolution of screen content sharing is relatively large, the data size of an IDR frame will be very large. Thus, when an IDR frame is to be sent, the data burst can deteriorate the uplink channel.

These factors contribute to the disadvantages of the traditional system of screen content sharing using H.264. A request from any receiver will invoke an IDR frame at the sender, but sending the IDR frame may result in worsening the video experience at all receivers. Controlling the number of IDR frames or data size of each IDR frame may alleviate the problem but at the expense of keeping some receivers waiting, or of lower video quality at all receivers, respectively.

A sophisticated system should be able to balance among the server capacity, network conditions, requests from individual receivers and the user experience of all users in the system.

DESCRIPTION OF EXAMPLE EMBODIMENTS

Overview

Techniques are provided to improve user experience at endpoint devices that are participating in a screen content sharing multipoint communication session. A server in a multipoint communication system receives video frames from a sending endpoint device in the communication session that involves one or more other endpoint devices that are to receive video frames from the sending endpoint device. The video frames represent screen content at the sending endpoint device and include key reference frames. The server stores the key reference frames. When a new receiving endpoint device joins the communication session, the server sends all the stored key reference frames to the new receiving endpoint device. The server determines network conditions with respect to existing receiving endpoint devices and decoding capacity of existing receiving endpoint devices. Existing receiving endpoint devices are classified into one of first or second groups such that one or more existing receiving endpoint devices are classified into a first group based on relatively poor network conditions or relatively low decoding capacity, or into a second group based on relatively good network conditions or relatively high decoding capacity. All video frames received from the sending endpoint device are forwarded to the second group of existing receiving endpoint devices. Key reference frames and some, but not all, non-key reference video frames are forwarded to the first group of existing receiving endpoint devices.

Example Embodiments

A scheme is disclosed herein for the application of real-time screen content sharing in a large scale multiple point (multipoint) communication system. This scheme utilizes video compression technology for the coding of the screen content. In particular, a unique architecture and adaptive algorithms are provided to quickly and efficiently respond to the various conditions among endpoints participating in a communication session.

This scheme addresses several challenges in a large scale multipoint communication system for screen content sharing. The H.264 video standard is referred to herein in connection with presentation of these techniques, but these techniques can be utilized with other video coding standards, now known or hereinafter developed.

Figure 1:
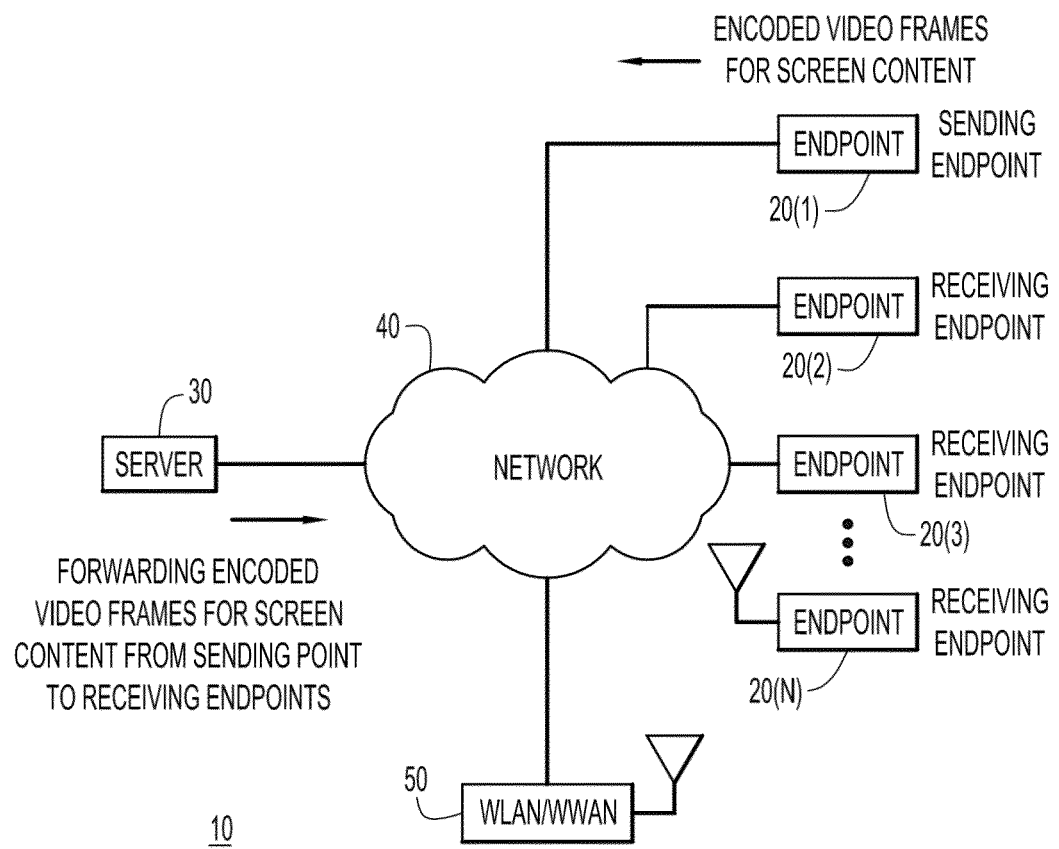
FIG. 1 is a block diagram of a communication system in which real-time screen content is shared among a plurality of endpoints.

Referring first to FIG. 1, a block diagram is shown of a multipoint communication system 10, in which endpoints 20(1)-20(N) can perform real-time communications, such as for real-time screen content sharing. In the system 10, there can be a relatively large number of endpoints, e.g., 20 or more, even hundreds of, endpoints. The system 10 includes a server 30 that coordinates communication sessions among two or more endpoints. The endpoints 20(1)-20(N) communicate with the server 30 via network 40, e.g., the Internet, including one or more local area networks and wide area network.

As shown in FIG. 1, some of the endpoints may be connected by wire to network 40, whereas others, e.g., endpoint 20(N), have a wireless link in their path to network 40. For example, endpoint 20(N) may wireless communicate with a base station or access point in a wireless local area network (WLAN) or wireless wide area network (WWAN), shown at reference numeral 50.

In a given communication session involving two or more endpoints, the endpoints communicate audio, video and other media content, e.g., documents or other applications running on an endpoint. For example, one endpoint may be sharing content currently displayed on that endpoint's display screen with one or more other endpoints in a communication session. This is called "screen content" sharing, and is very useful in web-based meetings. In the example of FIG. 1, endpoint 20(1) is sharing its screen content with endpoints 20(2)-20(N). In so doing, endpoint 20(1) sends encoded video frames representing its screen content to the server 30. The server 30 forwards the encoded video frames received from sending endpoint 20(1) to the receiving endpoints 20(2)-20(N).

The manner in which encoded video frames representing screen content from endpoint 20(1) are forwarded to receiving endpoints 20(2)-20(N) is now described with reference to FIG. 2.

The term "Key Reference frame" (KeyRef) is used herein to refer to the type of frames which have no dependency on non-KeyRefs. In other words, a KeyRef will use either intra-frame prediction or inter-frame prediction whose reference frame(s) is/are also a KeyRef. Instantaneous Decoding Refresh (IDR) frames in the H.264 standard, which only use intra-frame prediction and does not depend on any reference frames, are also KeyRefs.

The term "frame" is used herein as a basic unit, but it should be understood that the basic unit can be other units such as slices of frames.

Figure 2:
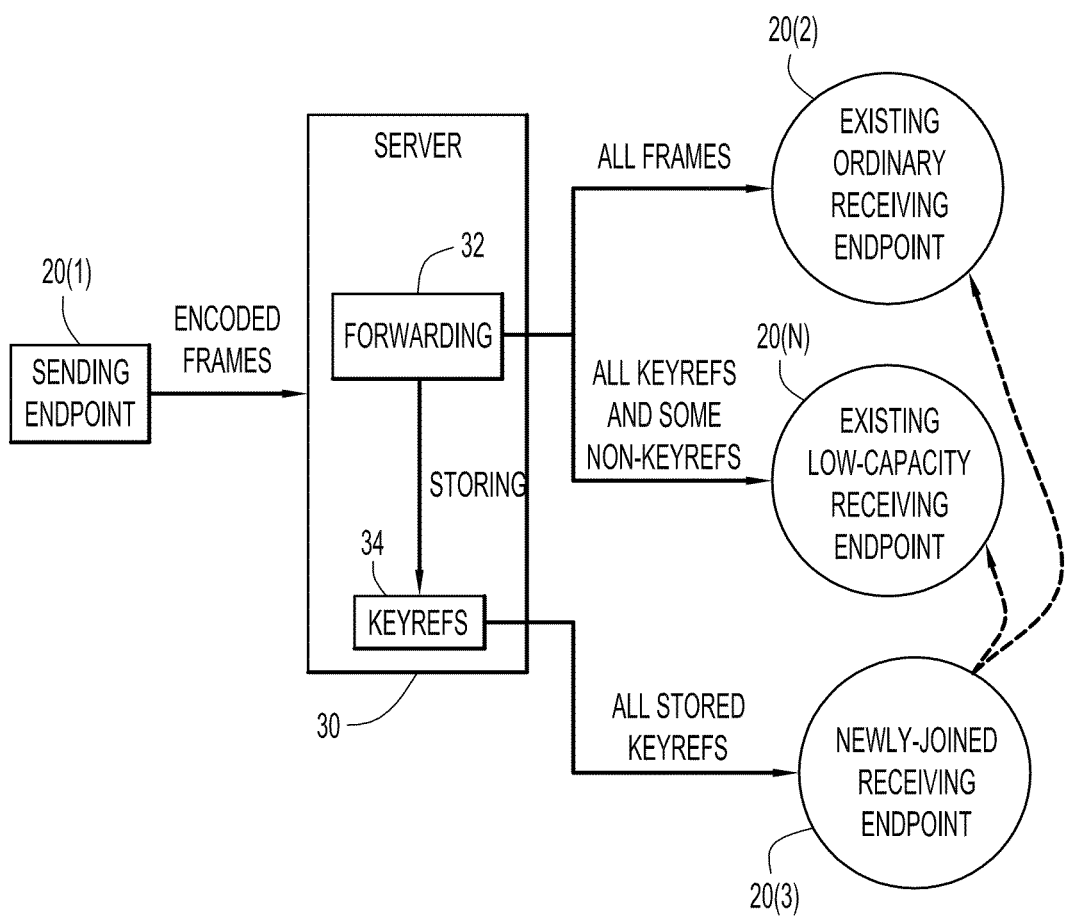
FIG. 2 is a flow diagram depicting operations performed at a server for forwarding frames of the screen content from a sending endpoint device to a plurality of receiving endpoint devices.

As shown at 32 in FIG. 2, the server 30 receives video frames from sending endpoint device 20(1) in a communication session that involves one or more other endpoint devices that are to receive video frames from the sending endpoint device 20(1). For example, endpoint devices 20(2), 20(3) and 20(N) are receiving endpoint devices. Endpoints 20(2) and 20(N) are existing receiving endpoints and endpoint 20(3) is a newly joining endpoint. The video frames represent screen content at the sending endpoint device 20(1) and include KeyRef frames. The server 30 stores all the KeyRef frames. In particular, the server 30 stores compressed and dependent KeyRef until an IDR frame arrives.

Adapting to Mixed-Type Receivers

The server sends all the stored KeyRefs to a new receiving endpoint device that joins the communication session, e.g., endpoint device 20(3). The server also determines network conditions with respect to existing receiving endpoint devices as well as determining/monitoring decoding capacity of existing receiving endpoint devices. The detection of downlink network conditions can be done using various network-detection methods, e.g., using Real-Time Transport Control Protocol (RTCP) feedback information. The detection of decoding capacity can be done at the beginning when setting-up the connection, and can use various methods as well, e.g., using descriptions as defined in the Session Description Protocol (SDP), or using proprietary-formatted messages. The server designates (existing) receiving endpoint devices as being low-capacity receiving endpoint devices in the communication session based on relatively poor network conditions (e.g., latency greater than a threshold or data rate lower than a threshold or packet-loss ratio greater than a threshold) or relatively low decoding capacity (with respect to a decoding capacity threshold). Conversely, the server designates receiving endpoint devices as being ordinary receiving endpoint devices in the communication session based on relatively good network conditions (latency lower than a threshold and data rate greater than a threshold) or relatively high decoding capacity (relative to a decoding capacity threshold). The specific methods for monitoring network conditions and decoding capacity mentioned herein are by example only and are not meant to limit the applicability of the techniques described herein.

As shown in FIG. 2, the server forwards all video frames received from the sending endpoint device 20(1) to existing ordinary receiving endpoint devices, e.g., endpoint device 20(2). However, the server forwards KeyRefs and some, but not all, non-KeyRefs to existing low-capacity receiving endpoint devices, e.g., endpoint device 20(N). According to the network conditions and the receiving endpoint's decoding capacity, KeyRefs and some non-KeyRefs will be forwarded to existing low-capacity receiving endpoint devices by the server. In the worst case, only KeyRefs will be forwarded to existing low-capacity receiving endpoint devices.

There may be different degrees of low-capacity receivers, so that the frames sent to each low-capacity receiver may not be the same set of frames. For example, to low-capacity receiver A KeyRefs plus frame numbers 1, 3, and 5 are sent, but to receiver B, with a lower capacity than receiver A, KeyRefs plus frame numbers 2 and 6 are sent. Thus, different key frames are forwarded to different low-capacity receiving endpoint devices based on the degree of low-capacity of the respective low-capacity receiving endpoint devices.

Thus, existing receiving endpoint devices are classified into a first group based on relatively poor network conditions or relatively low decoding capacity, or into a second group based on relatively good network conditions or relatively high decoding capacity. The designations of "ordinary" and "low-capacity" are dynamic in that an ordinary receiving endpoint device can become a low-capacity receiving endpoint if network conditions change, and vice versa. Moreover, a newly joining endpoint device will become either an ordinary receiving endpoint device or a low-capacity receiving endpoint device after it has joined the session for some period of time, and its designation or status can thereafter change.

Low-capacity receiving endpoint device may be endpoint devices that have a wireless link in their network connection, such as often the case for mobile devices, e.g., phones, tablet computers or laptop computers. In some circumstances, the network conditions can be so poor or unstable such that only KeyRef frames are forwarded to low-capacity receiving endpoint devices, or non-KeyRefs are skipped and not forwarded according to the network conditions. For example, a percentage of non-KeyRefs to be skipped and not forwarded is based on network conditions for that receiving endpoint device.

For mobile endpoint devices, computational capacity and battery consumption need to be considered. Keeping Maintaining the original (relatively large) video resolution used for screen sharing provides for a better user experience. Therefore, avoiding re-sampling or resolution-scaling is highly desirable. Intentionally skipping non-KeyRefs is efficient because it saves the computations associated with decoding large resolution content on mobile devices.

Response to Newly-Joined Receiving Endpoints

As explained above, when a new receiving endpoint device joins the communication session, all the KeyRefs stored at the server will be sent to that endpoint, and thereafter, that endpoint device can be designated as an ordinary receiving endpoint or a low-capacity receiving endpoint device, depending on network conditions and capacity at that endpoint device.

Sending Endpoint Device Operation

Figure 3:
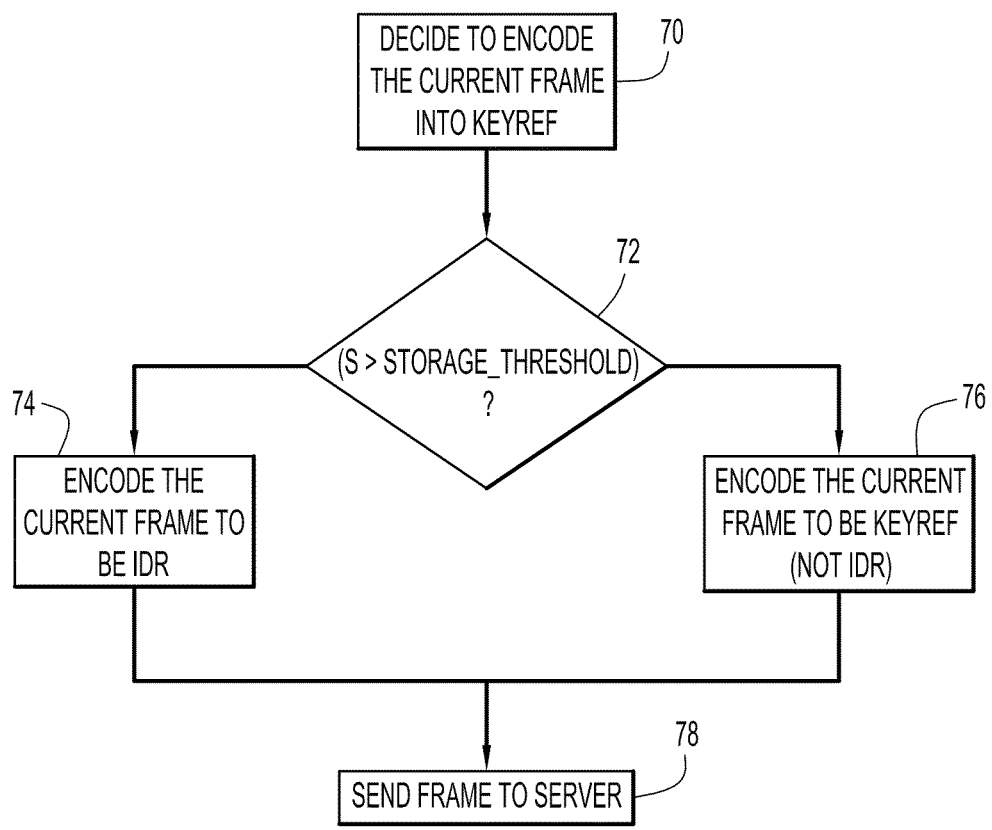
FIG. 3 is a flow diagram depicting operations performed at the sending endpoint device.

Reference is now made to FIG. 3 for a description of the operations performed at a sending endpoint device. At 70, the sending endpoint device generates and encodes KeyRef frames for content to be shared with other endpoints according to some strategy or policy that the sending endpoint device determines on its own, or in response to a command/request from the server 30 or from a receiving endpoint device. At 72, the sending endpoint device records the size s of all the encoded and dependent KeyRefs generated up to the current point in time. At 74, the sending endpoint device compares the size s with a threshold value, Storage_threshold, and processes a current frame to be encoded based/depending on the outcome of the comparison of the size s with the threshold value. In particular, if the size s is greater than the threshold value, then at 74, the processing of the current frame involves encoding the current frame as an IDR frame. On the other hand, if the size s is less than the threshold value, then at 76, processing of the current frame involves encoding the current frame as a KeyRef that is not an IDR frame. The current frame, after it is processed at 74 or 76, is then sent to the server at 78.

The Storage_threshold value is variable and related to the limitation of the storage space available on the server, as well as the downlink bandwidth of typical receiving endpoints. The reason that the Storage_threshold is affected by available storage on the server is intuitive since the storage capacity of the server is limited for each communication link. The reason that the Storage_threshold is affected by downlink bandwidth of typical receiving endpoints is to control the volume of data needed to be sent when a new receiving endpoint joins a communication session. When a new receiving endpoint joins, the server will send all the stored KeyRefs to the new receiving endpoint.

Thus, the following summarizes the operations performed at a sending endpoint device. At a sending endpoint device that is participating in a communication session that involves one or more other endpoint devices and is sending video frames representing screen content at the sending endpoint device, KeyRefs are generated and encoded that use either intra-frame prediction or inter-frame prediction based only on other key reference frames. A size is determined for all encoded key reference frames generated up to a current point in time. The size is compared with a threshold value. A current frame to be encoded is processed based on the comparison of the size with the threshold value. If the size is greater than the threshold value, then processing involves encoding the current frame as an IDR frame and if the size is less than the threshold value, then processing involves encoding the current frame as a KeyRef that is not an IDR frame. The current frame, after it is processed, is sent to the server.

Receiving Endpoint Operation

Receiving endpoints can perform decoding and synchronization between video content and other multimedia content. Receiving endpoints can also send out KeyRef requests as needed. Ordinary receiving endpoints and low-capacity receiving endpoints decode the frames they receive from the server. New receiving endpoints that join a communication session decode all the frames received from the server, but can choose to only present data derived from frames within a predetermined time period relative to timestamp information contained in a frame received from the server. Timestamp information included in frames may be used to control which frames are too "old" and thus should not be presented by a receiving endpoint. For example, if the timestamp information of the latest frame is t=n, and that of a first frame is t=0, a receiving endpoint can determine a value m which 0<m<n, such that all the frames with t<m may not be displayed.

Figure 4:
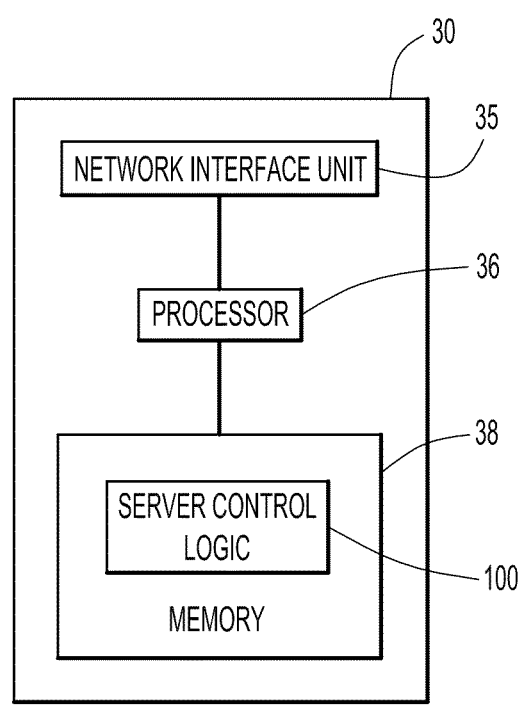
FIG. 4 is an example of a block diagram of the server.

Turning now to FIG. 4, an example block diagram is shown for the server 30. The server 30 is a computing device with network connectivity capabilities. The server 30 comprises a network interface unit 35, a processor 36 and a memory 38. The network interface unit 35 is configured to enable network communications on behalf of the server 30. The processor 36 is a microprocessor or microcontroller that executes instructions stored in memory 38. Several processors may be provided. The memory 38 stores executable instructions for server control logic 100. When the processor executes the server control logic 100, the server performs the operations described herein in connection with FIGS. 1 and 2.

The memory 38 may comprise read only memory (ROM), random access memory (RAM), magnetic disk storage media devices, optical storage media devices, flash memory devices, electrical, optical, or other physical/tangible memory storage devices. Thus, in general, the memory 38 may comprise one or more tangible (non-transitory) computer readable storage media (e.g., a memory device) encoded with software comprising computer executable instructions and when the software is executed (by the processor 36) it is operable to perform the operations described herein.

Figure 5:
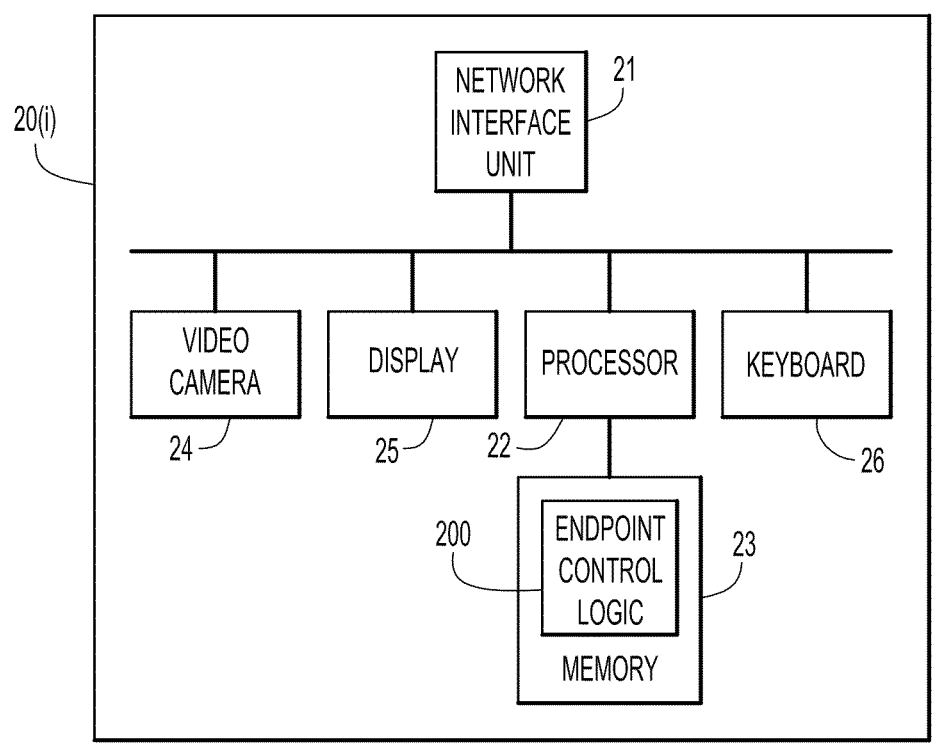
FIG. 5 is an example of a block diagram of the sending endpoint device.

FIG. 5 illustrates an example block diagram for an endpoint device, generically referred by reference numeral 20(i), which can send frames representing screen content data to be shared during a communication session. The endpoint device comprises a network interface unit 21, processor 22, memory 23, video camera 24, display 25 and keyboard 26. The network interface unit 21 enables network connectivity on behalf of the endpoint device and may include wireless network connectivity (e.g., WLAN or WWAN wireless connectivity) and/or wired network connectivity. The processor 22 comprises a microprocessor or microcontroller, for example. The memory 23 stores instructions for endpoint control logic 200 that are executed by the processor 22 to perform the sending and receiving endpoint operations described herein.

There are several advantages of the techniques described herein. First, as described below, the response time for a newly joining receiving endpoint is much faster. There is also reduced impact from newly-joining receiving endpoints on existing receiving endpoints. Moreover, the adaptation to a low-capacity receiving endpoint does not affect or negatively impact quality of high-capacity receiving existing endpoints (ordinary receiving endpoints).

Before further describing in more detail the advantages of these techniques, some definitions are provided.

| | |
|---|---|
| $BW_{uplink}$ | Uplink bandwidth from sender to server |
| $BW_{downlink}$ | Downlink bandwidth from server to receiver |
| $DataSize_P$ | Size of encoded frames of ordinary inter-prediction frame in H.264 (non-IDR, non-KeyRef), given a fixed video quality |
| $DataSize_{KeyRef} = \alpha_{KeyRef} * DataSize_P$ | Frame size of typical KeyRef frame in H.264, given a fixed video quality |
| $DataSize_{IDR} = \alpha_{IDR} * DataSize_P$ | Frame size of the IDR frame in H.264, given a fixed video quality |
| $\alpha_{KeyRef}$ | Typical data ratio between KeyRef and non-KeyRef after compression in H.264. According to real data in experiments, under some sender strategy, this parameter can be kept at around 130% or 140% for screen content coding |
| $\alpha_{IDR}$ | Typical data ratio between IDR KeyRef and non-IDR KeyRef after compression in H.264. As common case in H.264, this parameter can be of 5~10, or even 15 in screen content coding |

| | |
|---|---|
| CommandTransmissionTime$_{x \to y}$ | Time consumed to send a command message from $x$ to $y$ |

Fast Response to Newly-Joined Receiving Endpoint

The techniques described herein can provide faster response to newly-joined receiving endpoints than is possible in a traditional request-response system. The mathematical analysis explaining this improvement is as follows.

A quick response to a newly-joined receiving endpoint means a shorter waiting time for the user(s) at the endpoint to be presented with the first frame. The waiting time has the following components:

WaitingTime=Request from receiver to server+Request from server to sender+Frame transmission+Decoding Time For a traditional request-response system:

WaitingTime$_{traditional}$=CommandTransmissionTime$_{receiver \to Server}$+CommandTransmissionTime$_{Server \to sender}$+EncodingTime$_{IDR}$+Time_Frame-Transmission$_{IDR,sender \to Server}$+Time_Frame Transmission$_{IDR,Server \to receiver}$+DecodingTime$_{IDR}$ For a system configured according to the techniques described herein, the waiting time is:

WaitingTime$_{New}$=CommandTransmissionTime$_{receiver \to Server}$+0+0+0+Time_Frame-Transmission$_{Storage,Server \to receiver}$+DecodingTime$_{Storage}$ Although DecodingTime$_{Storage}$>DecodingTime$_{IDR}$, the time difference is small and even negligible since the decoder speed of H.264 is always high in real-time applications.

The time consumed in frame transmission can be further decomposed:

Time_FrameTransmission$_{traditional}$ =

Time_FrameTransmission$_{IDR,sender \to Server}$ +

Time_FrameTransmission$_{IDR,Server \to receiver}$ =

$\left( \frac{DataSize_{IDR}}{BW_{uplink}} + \frac{DataSize_{IDR}}{BW_{downlink}} \right)$ Time_FrameTransmission$_{New}$ =

0 + Time_FrameTransmission$_{Storage,Server \to receiver}$ =

$(DataSize_{Storage} / BW_{downlink})$

In typical networking conditions, $BW_{uplink} \leq BW_{downlink}$. So as long as $2 \times DataSize_{IDR} \geq DataSize_{Storage}$, then Time_FrameTransmission$_{tradition}$ >= Time_FrameTransmission$_{New}$, because $\left( \frac{DataSize_{IDR}}{BW_{uplink}} + \frac{DataSize_{IDR}}{BW_{downlink}} \right) \geq \left( \frac{DataSize_{IDR}}{BW_{downlink}} + \frac{DataSize_{IDR}}{BW_{downlink}} \right) = $ $\frac{2 \times DataSize_{IDR}}{BW_{downlink}} \geq \frac{DataSize_{Storage}}{BW_{downlink}}$ That is to say, by properly setting the size of stored frames, a shorter waiting time can be achieved by the techniques described herein for newly-joining receiving endpoints.

In particular, when screen content coding using H.264, the data size of an IDR frame using H.264 will be relatively large. Given the size relationship between IDR frames and non-IDR KeyRefs, the requirement $2 \times DataSize_{IDR} \geq DataSize_{Storage}$ is not hard to fulfill.

Reduced Impact from Newly-Joined Receiving Endpoints on Existing Receiving Endpoints These techniques avoid affecting existing receiving endpoints when new receiving endpoints join a session, which provides a better overall user experience. Even if receiving endpoints keep joining or asking for responses of a sending endpoint device in a short time, there will be no impact on the sending endpoint device, so that video experience of existing receiving endpoint devices will not be affected.

Consider a multipoint real-time screen content sharing system based on the Transport Control Protocol (TCP). TCP is used for easier explanation of an example.

In the traditional system, when a new receiving endpoint joins, the sending endpoint needs to send an IDR frame. Since the data size of IDR frames is greater than the data size of Predicted (P) frames, the time needed to transfer the IDR frame will be longer than it would be for ordinary P frames. This is particularly the case for screen content coding where the size difference between an IDR frame and ordinary P frames is substantial. If the bandwidth is not great enough, the delay will be noticeable to existing receiving endpoints. In other words, all existing receiving endpoints may experience noticeable delay when each new receiving endpoint joins. The repeating delay can be annoying to existing receiving endpoints, particularly when new receiving endpoints keep joining during a sharing session.

A similar result occurs when the bit rate fluctuation is concerned, which is a very common constraint in real-time systems. The sender will have to reduce the quality of the IDR frame to reduce the impact of a lower bit rate. In screen content coding, the reduction of quality will be obvious to a user. Fluctuation of video quality is also annoying to existing receiving endpoints when new receiving endpoints keep joining during a sharing session.

The techniques presented herein avoid such a problem, since the request from the new receiving endpoint will be fulfilled by the stored KeyRefs, thus the sending endpoint does not need to respond to the request with IDR frames. The experience of the existing receiving endpoints is not affected by joining of new receiving endpoints.

Adaptation to Low-Capacity Receiving Endpoint Request without Affecting Other Endpoints Using the techniques presented herein, high-capacity receiving endpoints can still make good use of its capacity to enjoy same video experience, even when there is low-capacity receiving endpoint in the multipoint screen content sharing session. The server selectively forwards non-KeyRefs to receiving endpoint devices according to network conditions, capacity, etc., of individual receiving endpoint devices.

In the traditional system, suppose both the uplink bandwidth of the sender and the downlink bandwidth of most existing receivers are $a_{BW\_downlink}$. Further, suppose there is one low-capacity receiver L in the system whose downlink bandwidth is ($\frac{1}{2} \times a_{BW\_downlink}$). If the sender chooses to send the bit stream at $a_{BW\_downlink}$, L will either experience delay or transmission loss of the bit stream and cannot view the shared screen content. If the sender chooses to send the bit stream at ($\frac{1}{2} \times a_{BW\_downlink}$), the other receivers that have good bandwidth conditions will have to endure lower quality of the shared screen content.

By contrast, in a system that employs the techniques described herein, the sender can send bit stream at $a_{BW\_downlink}$, and can keep the bit rate of the KeyRefs to be ($\frac{1}{2} \times a_{BW\_downlink}$). Low-Capacity receiver L can still view the shared screen content at a lower frame rate, meanwhile, the other receivers can enjoy the shared screen content at a normal quality and frame rate.

When a low-capacity receiver turns out to be an endpoint device whose computational capacity is low, such as users on mobile devices, the analysis will be similar.

In summary, a system is provided for real-time screen content sharing in a large scale setting (numerous endpoints). The sender, server and sometimes receiver as well, cooperate with each other to contribute in adaptation and fast-response of the multipoint system for screen content sharing.

Applications for the techniques described herein include screen content sharing, which can use different types of coding tools and allow flexible reference frame selection, as well as applications which use hybrid video coding scheme such as H.264. However, these techniques are not limited to H.264, and can be applied as long as the video coding method allows flexible reference frame decision and selection. These techniques can also be applied to camera video coding.

The techniques described herein may be implemented in one or more application specific integrated circuits (ASICs) in digital logic gates, or by a processor that executes instructions stored in a processor readable memory storage media, e.g., ROM, RAM or other non-transitory memory storage device, as part of equipment that performs encoding of screen content video (e.g., in a video endpoint and/or video conference switch or bridge) for transmission over a network.

These techniques tie together several ideas for video content sharing. The use of key reference frame and long-term-reference pictures is made to reduce the need of IDR frames. Server storage of past IDR and key reference frames are used to startup newly joining receiving endpoints without generating IDRs for every existing receiving endpoint. The bandwidth and capacity are tracked to classify endpoints and apply different adaptations, as needed.

The above description is intended by way of example only.

What is claimed is:

1. A method comprising:
   at a server in a multipoint content sharing system, receiving video frames from a sending endpoint device in a communication session that involves one or more other endpoint devices that are to receive video frames from the sending endpoint device, the video frames representing screen content at the sending endpoint device and including key reference frames, wherein the sending endpoint encodes a current key reference frame based on a comparison of a size of all currently encoded key reference frames to a threshold value;
   storing the key reference frames at the server;
   sending all the stored key reference frames to a new receiving endpoint device that joins the communication session;
   determining network conditions with respect to existing receiving endpoint devices and decoding capacity of existing receiving endpoint devices;
   classifying one or more existing receiving endpoint devices into a first group based on relatively poor network conditions or relatively low decoding capacity, or into a second group based on relatively good network conditions or relatively high decoding capacity;
   forwarding all video frames received from the sending endpoint device to the second group of existing receiving endpoint devices; and
   forwarding key reference frames and some, but not all, non-key reference video frames to the first group of existing receiving endpoint devices.

2. The method of claim 1, wherein for the first group of existing receiving endpoint devices, only key reference frames are forwarded.

3. The method of claim 2, wherein forwarding comprises forwarding different key reference frames to different receiving endpoint devices in the first group based on the degree of low-capacity.

4. The method of claim 1, wherein for existing receiving endpoint devices in the first group, some non-key reference frames are skipped and not forwarded.

5. The method of claim 4, further comprising determining a percentage of non-key reference frames to be skipped and not forwarded based on network conditions.

6. The method of claim 1, further comprising, at the sending endpoint device:
   processing a current frame to be encoded depending on the comparison of the size with the threshold value; and
   sending the current frame, after it is processed, to the server.

7. The method of claim 6, wherein if the size is greater than the threshold value, then processing comprises encoding the current frame as an instantaneous decoding refresh frame and if the size is less than the threshold value, then processing comprises encoding the current frame as a key reference frame that is not an instantaneous decoding refresh frame.

8. The method of claim 7, wherein the threshold value is related to a limitation of storage space available on the server and downlink bandwidth of receiving endpoints.

9. The method of claim 1, further comprising the existing receiving endpoints in the first and second groups decoding frames received from the server.

10. The method of claim 1, further comprising the new receiving endpoint device decoding all frames received from the server, but presenting all data or data derived from frames within a predetermined time period relative to timestamp information included in a frame received from the server.

11. A method comprising:
    at a sending endpoint device that is participating in a communication session that involves one or more other endpoint devices and is sending video frames representing screen content, generating and encoding key reference frames;
    determining a size of all encoded key reference frames generated up to a current point in time;
    comparing the size with a threshold value;
    encoding a current frame based on the comparison of the size with the threshold value; and
    sending the current frame, after it is processed, to a server that is configured to forward frames to receiving endpoint devices in the communication session.

12. The method of claim 11, wherein if the size is greater than the threshold value, then processing comprises encoding the current frame as an instantaneous decoding refresh frame and if the size is less than the threshold value, then processing comprises encoding the current frame as a key reference frame that is not an instantaneous decoding refresh frame.

13. The method of claim 12, wherein the threshold value is related to a limitation of storage space available on the server.

14. One or more non-transitory computer readable storage media encoded with software comprising computer executable instructions and when the software is executed operable to:
    at a server in a multipoint content sharing system, receive video frames from a sending endpoint device in a communication session that involves one or more other endpoint devices that are to receive video frames from the sending endpoint device, the video frames representing screen content at the sending endpoint device and including key reference frames, wherein the sending endpoint encodes a current key reference frame based on a comparison of a size of all currently encoded key reference frames to a threshold value;

store the key reference frames;

send all the stored key reference frames to a new receiving endpoint device that joins the communication session;

determine network conditions with respect to existing receiving endpoint devices and decoding capacity of existing receiving endpoint devices;

classify one or more existing receiving endpoint devices into a first group based on relatively poor network conditions or relatively low decoding capacity, or into a second group based on relatively good network conditions or relatively high decoding capacity;

forward all video frames received from the sending endpoint device to the second group of existing receiving endpoint devices; and forward key reference frames and some, but not all, non-key reference video frames to the first group of existing receiving endpoint devices.

15. The non-transitory computer readable storage media of claim 14, wherein the instructions operable to forward frames to existing receiving endpoint devices in the first group comprise instructions to forward only key reference frames.

16. The non-transitory computer readable storage media of claim 14, wherein the instructions operable to forward frames to existing receiving endpoint devices in the first group comprise instructions to skip and not forward some non-key reference frames.

17. The non-transitory computer readable storage media of claim 16, further comprising instructions operable to determine a percentage of non-key reference frames to be skipped and not forwarded based on network conditions.

18. One or more non-transitory computer readable storage media encoded with software comprising computer executable instructions and when the software is executed operable to:

at a sending endpoint device that is participating in a communication session that involves one or more other endpoint devices and is sending video frames representing screen content, generate and encode key reference frames;

determine a size of all encoded key reference frames generated up to a current point in time;

compare the size with a threshold value;

encode a current frame based on the comparison of the size with the threshold value; and send the current frame, after it is processed, to a server that is configured to forward frames to receiving endpoint devices in the communication session.

19. The non-transitory computer readable storage media of claim 18, further comprising instructions operable to, if the size is greater than the threshold value, then encode the current frame as an instantaneous decoding refresh frame and if the size is less than the threshold value, then encode the current frame as a key reference frame that is not an instantaneous decoding refresh frame.

20. An apparatus comprising:

a network interface unit configured to enable communications over a network;

a memory;

a processor coupled to the network interface unit and the memory, the processor configured to:

receive video frames from a sending endpoint device in a screen content sharing communication session that involves one or more other endpoint devices that are to receive video frames from the sending endpoint device, the video frames representing screen content at the sending endpoint device and including key reference frames, wherein the sending endpoint encodes a current key reference frame based on a comparison of a size of all currently encoded key reference frames to a threshold value;

store the key reference frames;

send all the stored key reference frames to a new receiving endpoint device that joins the communication session;

determine network conditions with respect to existing receiving endpoint devices and decoding capacity of existing receiving endpoint devices;

classify one or more existing receiving endpoint devices into a first group based on relatively poor network conditions or relatively low decoding capacity, or into a second group based on relatively good network conditions or relatively high decoding capacity;

forward all video frames received from the sending endpoint device to the second group of existing receiving endpoint devices; and forward key reference frames and some, but not all, non-key reference video frames to the first group of existing receiving endpoint devices.

21. The apparatus of claim 20, wherein the processor is further configured to forward only key reference frames to existing receiving endpoint devices in the first group.

22. The apparatus of claim 20, wherein the processor is further configured to skip and not forward some non-key reference frames to existing receiving endpoint devices in the first group.

23. A system comprising the apparatus of claim 20, and further comprising the sending endpoint device, wherein the sending endpoint device is configured to:

process a current frame to be encoded depending on the comparison of the size with the threshold value; and send the current frame, after it is processed, to the apparatus.

24. The system of claim 23, wherein the sending endpoint device is configured to, if the size is greater than the threshold value, encode the current frame as an instantaneous decoding refresh frame and if the size is less than the threshold value, encode the current frame as a key reference frame that is not an instantaneous decoding refresh frame.

* * * * *